United States Patent [19]
Huff et al.

[11] Patent Number: 6,052,769
[45] Date of Patent: Apr. 18, 2000

[54] METHOD AND APPARATUS FOR MOVING SELECT NON-CONTIGUOUS BYTES OF PACKED DATA IN A SINGLE INSTRUCTION

[75] Inventors: Thomas R. Huff; Shreekant Thakkar, both of Portland, Oreg.; Nathaniel Hoffman, Las Vegas, Nev.

[73] Assignee: Intel Corporation, Santa Clara, Calif.

[21] Appl. No.: 09/052,881

[22] Filed: Mar. 31, 1998

[51] Int. Cl.$^7$ .................................................. G06F 15/80
[52] U.S. Cl. .................................................. 712/3; 710/68
[58] Field of Search ................................ 712/221, 208, 712/226, 22, 224; 710/68

[56] References Cited

U.S. PATENT DOCUMENTS

| | | | |
|---|---|---|---|
| 5,555,428 | 9/1996 | Radigan | 395/800.22 |
| 5,621,674 | 4/1997 | Gray | 364/715.02 |
| 5,680,597 | 10/1997 | Kumar et al. | 712/226 |
| 5,682,491 | 10/1997 | Pechanek et al. | 712/209 |

OTHER PUBLICATIONS

Patent Cooperation Treaty's International Search Report for International Application No. PCT/US99/04893, dated Jun. 3, 1994, 4 pages.

Hansen, Craig, "Architecture of a Broadband Mediaprocessor," Abstract, Proceedings of COMPCON '96, Feb. 25–28, 1996, pp. 334–340.

Hayes et al., "MicroUnity Software Development Environment," Abstract, Proceedings of COMPCON '96, Feb. 25–28, 1996, pp. 341–348.

Abbott et al., "Broadband Algorithms with the MicroUnity Mediaprocessor," Abstract, Proceedings of COMPCON '96, Feb. 25–28, 1996, pp. 349–354.

Levinthal, A. and Porter, T., "Chap—A SIMD Graphics Processor," Abstract, Computer Graphics Project, Lucasfilm Ltd., 1984, pp. 77–82.

Wang et al., A Processor Architecture for 3D Graphics Calculations, Computer Motion Inc., pp. 1–23.

Levinthal et al., "Parallel Computers for Graphics Applications," Abstract, Proceedings: Second International Conference On Architectural Support For Programming Languages And Operating Systems (ASPLOS II), c. 1987, pp. 193–198.

"Tri Media TM1000 Preliminary Data Book,"Table of Contents, Chapters 2–4 and Appendix A, 1997 Phillips Electronics North America Corporation, c. 1997.

"21164 Alpha Microprocessor Data Sheet," Cover, Table of Contents, Chapters 6, 8 and 10, Samsung Electronics, c. 1997.

"Silicon Graphics Introduces Enhanced MIPS Architecture to Lead the Interactive Digital Revolution," Press Release, Oct. 21, 1996, pp. 1–2.

"Silicon Graphics Introduces Compact MIPS RISC Microprocessor Code for High Performance at a Low Cost," Press Release, Oct. 21, 1996, pp. 1–2.

"MIPS V Instruction Set," MIPS V Specification, Rev. 1.0, pp. B1–B37.

"MIPS Digital Media Extension," MDMX, Rev. 1.0, C1–C40.

"MIPS Extension for Digital Media with 3D," MIPS Technologies, Inc., Mar. 12, 1997, pp. 0–26.

"64–bit and Multimedia Extensions in the PA–RISC 2.0 Architecture," Microprocessors Precision Architecture from Hewlett Packard webpage, printed Jul. 17, 1997, pp. 1–18.

(List continued on next page.)

*Primary Examiner*—Eric Coleman
*Attorney, Agent, or Firm*—Blakely, Sokoloff, Taylor & Zafman LLP

[57] ABSTRACT

A method comprises decoding a single instruction having a first operand identifying a plurality of bytes of packed data and a second operand identifying a corresponding plurality of byte masks. Each of the plurality of byte masks identified by the second operand of the single decoded instruction are analyzed, wherein select bytes of the plurality of bytes identified by the first operand are moved to an implicitly defined location based, at least in part, on the analysis of the individual byte masks identified by the second operand of the single decoded instruction.

16 Claims, 8 Drawing Sheets

OTHER PUBLICATIONS

"The VIS™ Instruction Set," from Sun Microelectronics webpage, printed Jul. 17, 1997, pp. 1–2.

"The Visual Instruction Set (VIS™): On Chip Support for New–Media Processing," Whitepaper 95–022, from Sun Microelectronics webpage, printed Jul. 17, 1997, pp. 1–7.

"Ultrasparc™ The Visual Instruction Set (VIS™): On Chip Support for New–Media Processing," Whitepaper 95–022, from Sun Microelectronics webpage, Jun. 6, 1996, pp. 1–7.

"Ultrasparc™ and New Media Support Real–time MPEG2 Decode with the Visual Instruction Set (VIS™)," Whitepaper 95–028, from Sun Microelectronics webpage, Jun. 26, 1996 pp. 1–8.

"Ultrasparc™ Ultra Support Architecture (UPA): The New–Media System Architecture," Whitepaper 95–023, from Sun Microelectronics webpage, Jun. 6, 1996, pp.1–4.

"Ultrasparc™ Turbocharges Network Operations and New Media Computing," Whitepaper 95–029,from Sun Microelectronics webpage, Jun. 6, 1996, pp. 1–5.

"The UltraSPARC Processor—Technology White Paper," Table of Contents and Sections 1–5, Nov. 14, 1995, 36 pages.

"Visual Instruction Set (VISTM) User's Guide," Sun Microsystems, Version 1.1, Mar. 1997, cover page—Chapter 5, 138 pages.

METHOD AND APPARATUS FOR MOVING SELECT NON-CONTIGUOUS BYTES OF PACKED DATA IN A SINGLE INSTRUCTION

BACKGROUND OF THE INVENTION

1. Field of the Invention

The present invention relates to the field of computer systems and, in particular, to a method and apparatus for moving select, non-contiguous bytes of packed data in a single instruction.

2. Background Information

Computer technology continues to evolve at an ever increasing rate. Gone are the days when the computer was merely a business tool primarily used for word-processing and spreadsheet applications. Today, with the evolution of multimedia applications, computer systems have become a common home electronic appliance, much like the television and home stereo system. Indeed, the line between computer system and other consumer electronic appliance has become blurred as multimedia applications executing on an appropriately configured computer system will function as a television set, a radio, a video playback device, and the like. Consequently, the market popularity of computer systems are often decided by the amount of memory they contain and the speed at which they can execute such multimedia applications.

Those skilled in the art will appreciate that multimedia and communications applications require the manipulation of large amounts of data represented in a small number of bits to provide the true-to-life renderings of audio and video we have come to expect. For example, to render a 3D graphic, large amounts of eight-bit data must be similarly processed. Prior art processors would have to issue a number of time consuming eight-bit instructions which are identical in order to render such a 3D graphic. To improve the efficiency of multimedia applications, as well as other applications with similar characteristics, the Single Instruction, Multiple Data (SIMD) processor architecture has been developed to improve computer system performance by processing several bytes of information in a single instruction.

SIMD architectures take advantage of packing many bytes of data within one register or memory location, employing a data type known in the art as packed data. Packed data generally refers to the representation of multiple numbers by a single value. For example, four eight-bit integer numbers may be represented by a single 32-bit number having four eight-bit segments. That is, multiple bytes of data may be embedded within a single operand of a single instruction. Accordingly, a single instruction may be used to process multiple data elements embedded within a single operand, resulting in significant performance improvements.

Theoretically, with its ability to process multiple bytes of data with one instruction, it has been shown that the SIMD processor architecture is capable of performance improvements of up to 4× over non-SIMD processor architectures, while improvements of 1.5× to 2× are more typical. There are a couple of reasons why the theoretical 4× performance improvement has not been reached. One reason is the manner in which prior art SIMD processor architectures process packed data. That is, the 4× performance mark of the SIMD processor architecture can only be achieved when the entire set of data embedded within packed data are to be similarly processed by the instruction. In instances where select, non-contiguous bytes of the packed data are to be processed, inefficiencies result due to the need for multiple instructions and additional cache management. For example, a prior art move operation (MOVQ SRC1, DEST) typically moves packed data identified by a first operand (SRC1) to a location identified by a second operand (DEST). As shown, the entire packed data set identified by SRC1 will be moved to the location identified by DEST. Moving select, non-contiguous bytes of the packed data identified by SRC1 would require multiple instructions.

One example of a prior art approach to moving select, non-contiguous bytes of packed data might be accomplished by the test, branch and write series of instructions. In accordance with this prior art approach, each byte of the packed data is transferred to an integer register, along with a corresponding mask bit. The mask bit is tested and a branch is used to either write or bypass writing the byte to memory. This approach requires many more instructions, and also suffers a performance penalty for poor branch prediction.

Another example of a prior art approach to moving select, non-contiguous bytes of packed data is the conditional move. In the conditional move, each byte of the packed data is transferred to an integer register, along with a corresponding mask bit. The mask bit is tested and used with a conditional move instruction to write the byte to memory. This approach avoids the performance penalties of the branch misprediction identified above, but still requires a number of instructions to identify and move select, non-contiguous bytes of the packed data.

Moreover, in addition to the performance loss incurred with the necessity of multiple instructions, the cache management associated with these multiple instructions also results in a performance loss of prior art SIMD processor architectures. That is, those skilled in the art will appreciate that a move instruction is a series of write instructions at the micro-architecture level and, as such, require a corresponding number of writes to the local processor cache before updating the desired register or main memory location. Thus, the prior art move instructions often result in a number of intermediate writes to the local to processor cache, wherein much of the data written to the cache will never again be accessed by the processor, resulting in wasted cache resources.

Thus, a need exists for an improved SIMD architecture and instruction set which utilizes the packed data format in a more effective manner. Those skilled in the art will appreciate that the teachings of the present invention achieves these and other desired results, as will become apparent from the description to follow.

SUMMARY OF THE INVENTION

In accordance with the teachings of the present invention, a method and apparatus for moving select bytes of packed data in a single instruction is disclosed. In a first embodiment of the present invention, for example, a method comprises decoding a single instruction having a first operand identifying a plurality of bytes of packed data and a second operand identifying a corresponding plurality of byte masks. Each of the plurality of byte masks identified by the second operand of the single decoded instruction are analyzed, wherein select bytes of the plurality of bytes identified by the first operand are moved to an implicitly defined location based, at least in part, on the analysis of the individual byte masks identified by the second operand of the single decoded instruction.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features have been omitted or simplified for ease of explanation. Furthermore, for ease of understanding certain method steps are delineated as separate steps, however, these separately delineated steps should not be construed as necessarily order dependent in their performance.

To provide a foundation for understanding the description of the alternate embodiments of the present invention, the following definitions are offered:

| | |
|---|---|
| [Z:Y] | denotes the most significant (Z) and least significant (Y) bits in a range of bits. Those skilled in the art will appreciate that the sizes provided are merely illustrative and that data ranges, bus widths, and the like could be of greater or lesser size without deviating from the spirit and scope of the present invention. |
| SRC1, SRC2 and DEST: | identify storage areas, e.g., memory addresses, registers, etc. |

Computer System

Figure 1:
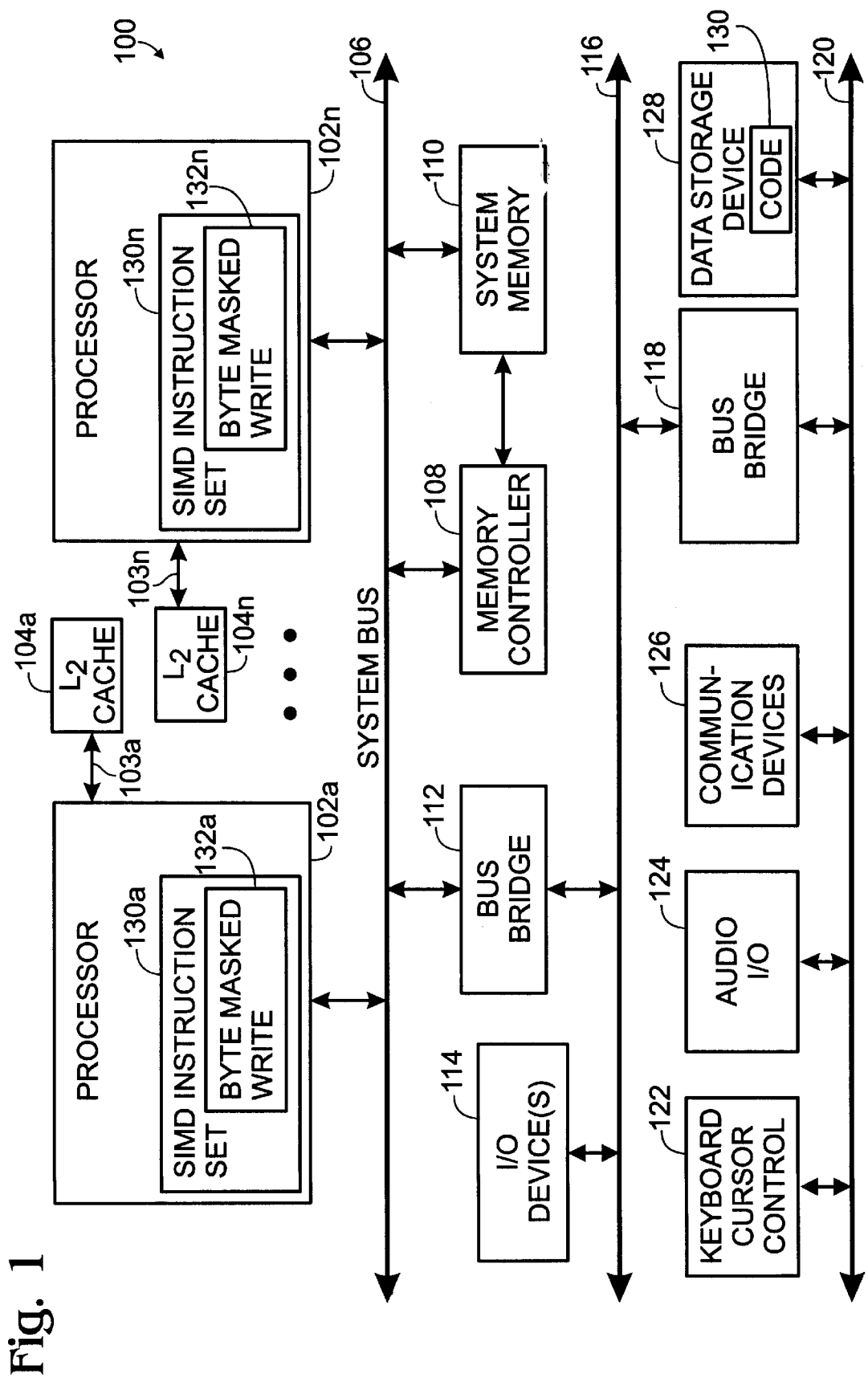
FIG. 1 is a block diagram illustrating an example computer system within which the teachings of the present invention may be practiced.

Turning to FIG. 1, a block diagram of an example computer system 100 incorporating the teachings of the present invention is depicted, in accordance with one embodiment of the invention. That is, in accordance with teachings of the present invention, to be described more fully below, computer system 100 is operative to move select, non-contiguous bytes of packed data to/from SIMD registers and system memory in response to execution of a single instruction, a byte masked write instruction (e.g., MASKMOVQ SRC1, SRC2). More specifically, computer system 100 includes processor(s) 102a–102n which are operative to decode a byte masked write instruction (MASKMOVQ) having a first operand (SRC1) and a second operand (SRC2), analyze individual bits of data identified by the second operand of the decoded byte masked write instruction (SRC2), and move select, non-contiguous bytes of packed data identified by the first operand (SRC1) to an implicitly defined location based, at least in part, on the analysis of the individual bits of data identified by the second operand (SRC2). Accordingly, those skilled in the art will appreciate from the description to follow that processor(s) 102a–102n incorporating the innovative microarchitecture and the enhanced instruction set including the innovative byte masked write instruction of the present invention, overcomes the prior art limitations of multiple instructions and inefficient cache management by moving select, non-contiguous bytes of packed data to an implicitly defined location.

In accordance with the illustrated example embodiment of FIG. 1, processor(s) 102a–102n are depicted including a SIMD instruction set 130a–130n, respectively, which includes the innovative byte masked write instructions 132a–132n, to be described more fully below. As shown, processors 102a–102n are coupled to corresponding level 2 (L2) caches 104a and 104n via backside bus 103a and 103n, respectively, and to system bus 106, or any other hardware/software means for communicating with other system components and each other. Although depicted with an L2 cache, those skilled in the art will appreciate that a processor (e.g., processor(s) 102) may well have more or less levels of cache, and/or have all of the levels within the processor, dispensing with the need for the backside bus. As depicted, system memory 110 is coupled to system bus 106 via memory controller 108. Bus bridge 112, sometimes referred to as the north bridge, interfaces system bus 106 with a first input/output (I/O) or peripheral bus 116. In one embodiment, the first I/O bus 116 is a high performance Peripheral Component Interconnect (PCI) bus. As depicted, first I/O bus 116 is operative to support a number of I/O devices cumulatively referenced as 114. In one embodiment, for example, first I/O bus 116 is operative to support a number of high performance I/O devices that require the high performance data rate provided by the first I/O bus 116. In one embodiment, for example, I/O devices 114 includes a digital video camera.

As depicted, first I/O bus 116 is coupled to a second I/O bus 120 via bus bridge 118. In one embodiment, second I/O bus 118 is an Industry Standard Architecture (ISA) I/O bus. As depicted, second I/O bus 120 receives keyboard and cursor control device 122, audio I/O device(s) 124, communication device(s) 126, and data storage device 128 having code 130 stored therein. Those skilled in the art will appreciate that computer system 100 may well include additional or fewer system components without deviating from the spirit and scope of the present invention. For example, computer system 100 may include but one processor 102 incorporating the teachings of the present invention. Thus, alternate system component configurations are anticipated within the scope of the present invention. Moreover, except for processor(s) 102a–102n incorporating the teachings of the present invention, to be described more fully below, system components 106–128 each perform their respective functions, as commonly known in the art. Accordingly, they need not be further described here.

Except for the teachings of the present invention, as described herein, processors 102a–102n are intended to represent any of a number of alternative processor and micro-architecture implementations. For example, processors 102a–102n may well be complex instruction set computer (CISC) processors, reduced instruction set computer (RISC) processors, very long instruction word (VLIW) processors, and any other type of processor.

Processor Architecture

Figure 2:
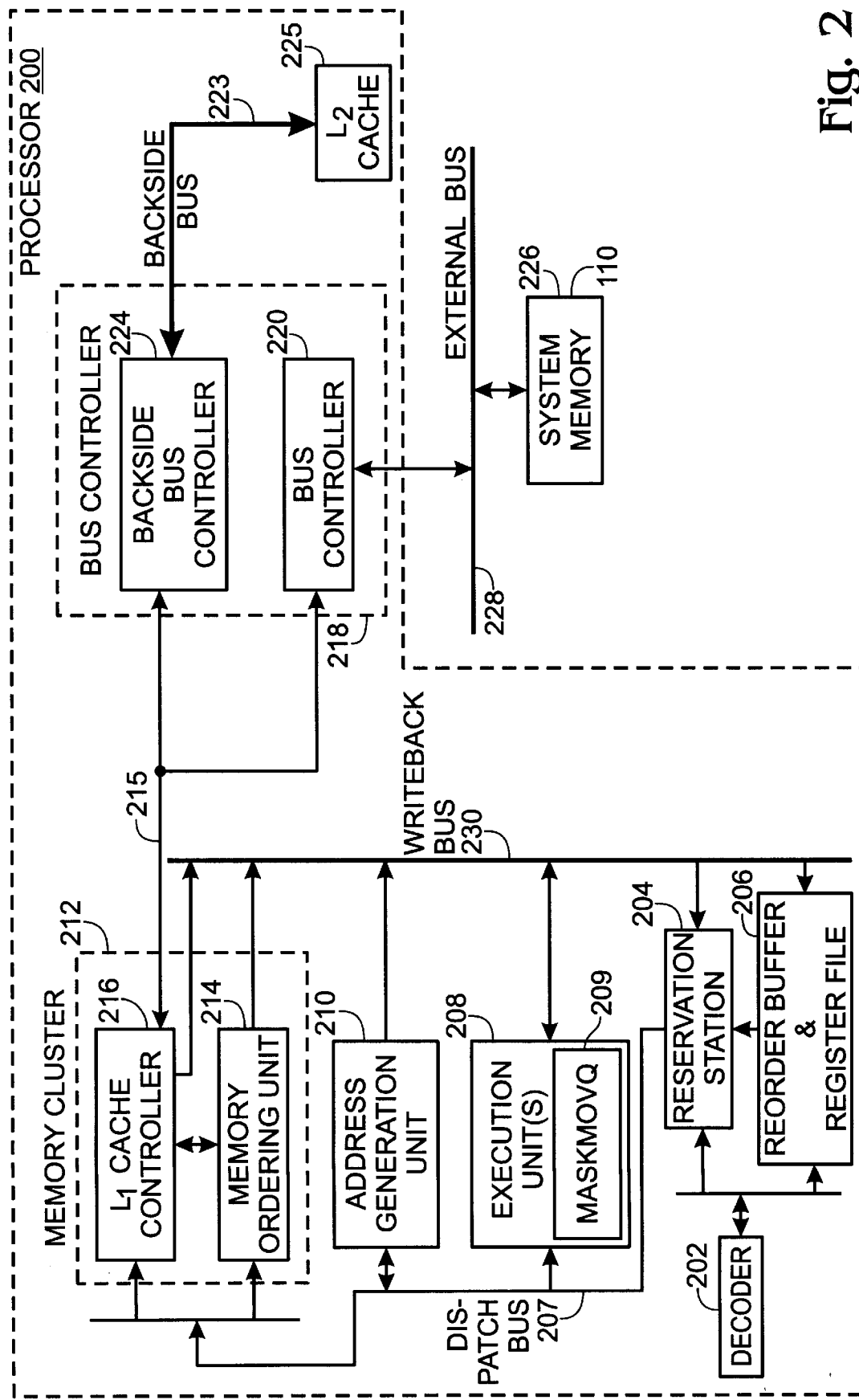
FIG. 2 illustrates a block diagram of an example processor incorporating the teachings of the present invention, in accordance with one embodiment of the present invention.

One example of a processor incorporating the teachings of the present invention is provided with reference to FIG. 2. In accordance with one embodiment of the present invention, processor 200 may be beneficially integrated in to computer system 100 as any or all of processor(s) 102a–102n. Thus, in accordance with the teachings of the present invention, to be described below, processor 200 is operative to move select, non-contiguous bytes of packed data to an implicitly defined location, as a result of executing a single byte masked write macro-instruction.

In accordance with the teachings of the present invention, processor 200 is shown comprising decoder 202, reorder buffer and register file 206, execution unit(s) 208, address generation unit 210, memory subsystem 212 and bus controller 218, cooperatively coupled as depicted to selectively move non-contiguous bytes of packed data in a single instruction. Additionally, in accordance with the illustrated example embodiment of FIG. 2, processor 200 is shown comprising reservation station 204 coupled to execution units 208, address generation unit 210 and memory cluster 212 via dispatch bus 207. As depicted, memory subsystem 212 is shown comprising memory ordering unit 214 and L1 cache controller 216, while bus controller 218 is shown comprising backside bus controller 224 and external bus controller 220. Those skilled in the art may well recognize that processor 200 elements 202 through 216 are often cumulatively referred to as the execution core of a processor. As shown, memory cluster 212, AGU 210 and execution units 208 are coupled to a writeback bus 230 of the execution core, which supports the speculative nature of the processor 200. Although a particular micro-architectural implementation of processor 200 is provided in FIG. 2, those skilled in the art will appreciate that micro-architectural changes may be made without deviating from the spirit and scope of the present invention. For example, more or less micro-architectural blocks may well be employed to move select, non-contiguous bytes of packed data in a single instruction.

As depicted in FIG. 2, memory cluster 212 is coupled to bus controller 218 including extended bus controller 220 and backside bus controller 224, interconnected as shown. Additionally, extended bus controller 224 and backside bus controller 220 of bus controller 218 are coupled to system memory 110 via external host bus 106, and to L2 cache 103 via backside bus 223, as shown.

Those skilled in the art will appreciate that decoder 202 is operative to decode instructions received by processor 200. For example, in accordance with the teachings of the present invention, when processor 200 receives a byte masked write instruction such as, for example, the quadword byte masked move instruction (MASKMOVQ SRC1, SRC2), decoder 202 decodes the macro-instruction and causes execution units 208 to perform the required byte masked write. Decoder 202 may be implemented using any number of alternative mechanisms including, but not limited to, a look-up table, programmable logic array (PLA), state-tables, and the like.

In one embodiment of the present invention, execution unit(s) 208 may include circuitry to perform scalar and/or SIMD operations on integer and/or floating point data. In addition to recognizing instructions typically implemented in general purpose processors, execution unit(s) 208 recognizes instructions in SIMD instruction set 209 for performing operations of packed data formats. In accordance with the teachings of the present invention, to be described more fully below, SIMD instruction set 209 includes the byte masked write instructions operative to move select, non-contiguous bytes of packed data in a single instruction. Of course, SIMD instruction set 209 may also include other SIMD instructions for manipulating packed data.

Figure 3:
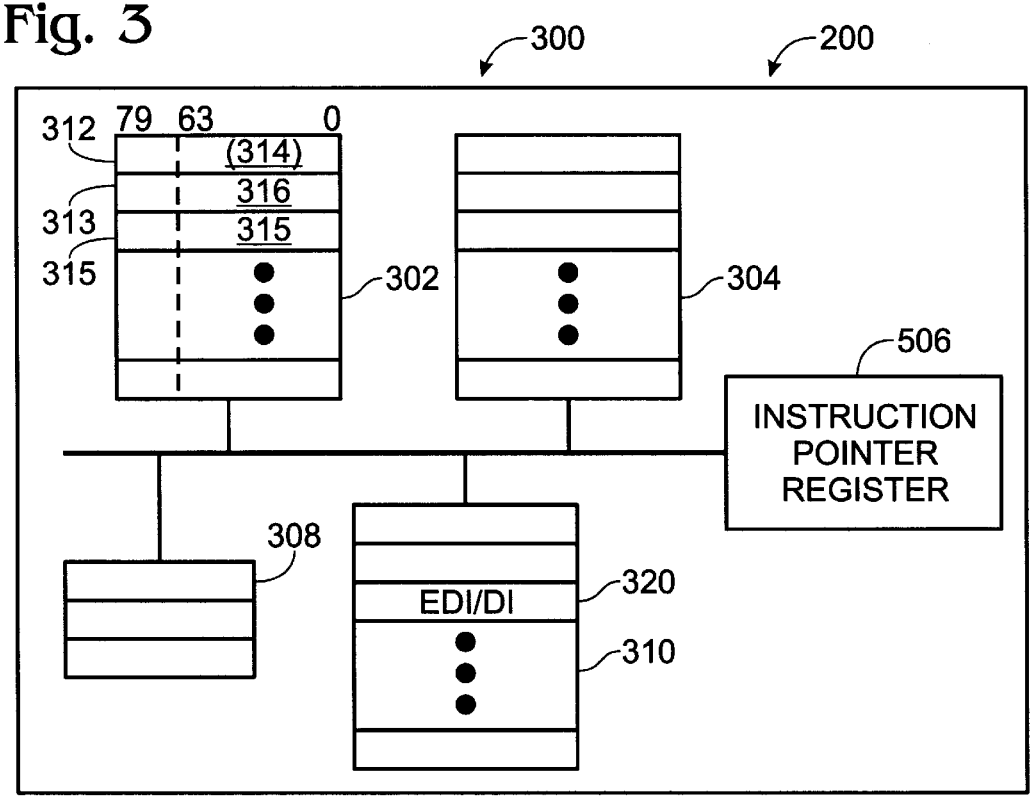
FIG. 3 illustrates an example register file of the example processor of FIG. 2, in accordance with one embodiment of the present invention.

As alluded to above, execution unit(s) 208 are coupled to reorder buffer and register file 206 by internal writeback bus 230. One example of an architectural register file according to one embodiment of the present invention is depicted in FIG. 3. Those skilled in the art will appreciate that register file 300 represents a storage area on processor 200 for storing information, including data. In accordance with one aspect of the present invention, to be discussed more fully below, register file 300 includes general purpose registers 310, integer registers 304, floating point registers 312, SIMD registers 314, status registers 308 and instruction pointer register 306. In one embodiment of the present invention, a general purpose register of general purpose registers 310 is used to store data identifying target location(s) wherein select, non-contiguous bytes of packed data will be written upon execution of the byte masked write instruction. More specifically, in accordance with one embodiment of the present invention, an (E)DI register 320 within general registers 310 store data identifying the target location(s) for the byte masked write instructions. In accordance with the illustrated embodiment of FIG. 3, SIMD registers 314, 316, 318, etc. occupy the 64-bit mantissa of floating point registers 312, 313, 315, etc., respectively. Of course, alternative embodiments could support more, less and/or different architectural registers and register sizes.

It is important to note that any register architecture may well be used in accordance with the teachings of the present invention. Some architectures, for example, provide for a predetermined number of each of the foregoing registers. Alternatively, an architecture may well provide for a pool wherein a particular register may be used as a integer register at one point in time and a SIMD register at another point in time, such as in a processor that uses a register renaming scheme. It is also important to note that what is called a register may well be multiple registers treated as a single register. For example, a processor may provide multiple 64-bit registers that may be used as two 32-bit integer registers. Thus, those skilled in the art will appreciate that any of a number of alternate architectures may well be used without deviating from the spirit or scope of the present invention.

Continuing with the description of processor 200, address generation unit 210 is operative to receive the decoded byte masked write instruction from reservation station 204 and analyze the byte mask identified by the second operand of the decoded byte masked write instruction, in addition to its typical function of address generation. More specifically, in accordance with one aspect of the present invention, address generation unit 210 determines whether the incoming byte masked write instruction is aligned, and whether the access is split across cache lines. If the incoming byte masked write instruction is to be split across cache lines, address generation unit 210 provide an indication of such line split to memory ordering unit 214. Additionally, in accordance the teachings of the present invention, address generation unit 210 performs a check to determine whether the mask identified by the second operand is all zeroes. In one embodiment, address generation unit 210 OR's all of the mask bits together and, if the result is a logic zero, it flags the masked write as a no-operation (NOP), and the instruction is retired without further processing. More specifically, in one embodiment, the byte masked write is never dispatched to L1 cache controller 216, thereby freeing up the store port dispatch for other stores and not unnecessarily occupying the memory subsystem of processor 200 Thus, in accordance with one aspect of the present invention, address generation unit 210 determines whether the mask of the received byte masked write instruction is all zeroes and, if so, saves a pipeline stage by discarding the masked write as a NOP.

In one embodiment, memory ordering unit 214 is comprised of an array of three buffers, a load buffer and two store buffers, e.g., a store address buffer and a store data buffer. Accordingly, memory ordering unit 214 includes two separate write buffers, whereas load instructions are performed in one micro-operation utilizing only one buffer. In accordance with one embodiment, to be described more fully below, a byte masked write instruction is a sixteen-byte instruction, which is dispatched as two separate eight-byte masked write operations. One example of memory ordering unit 214 and its buffers is provided in the block diagram of FIG. 4.

Figure 4:
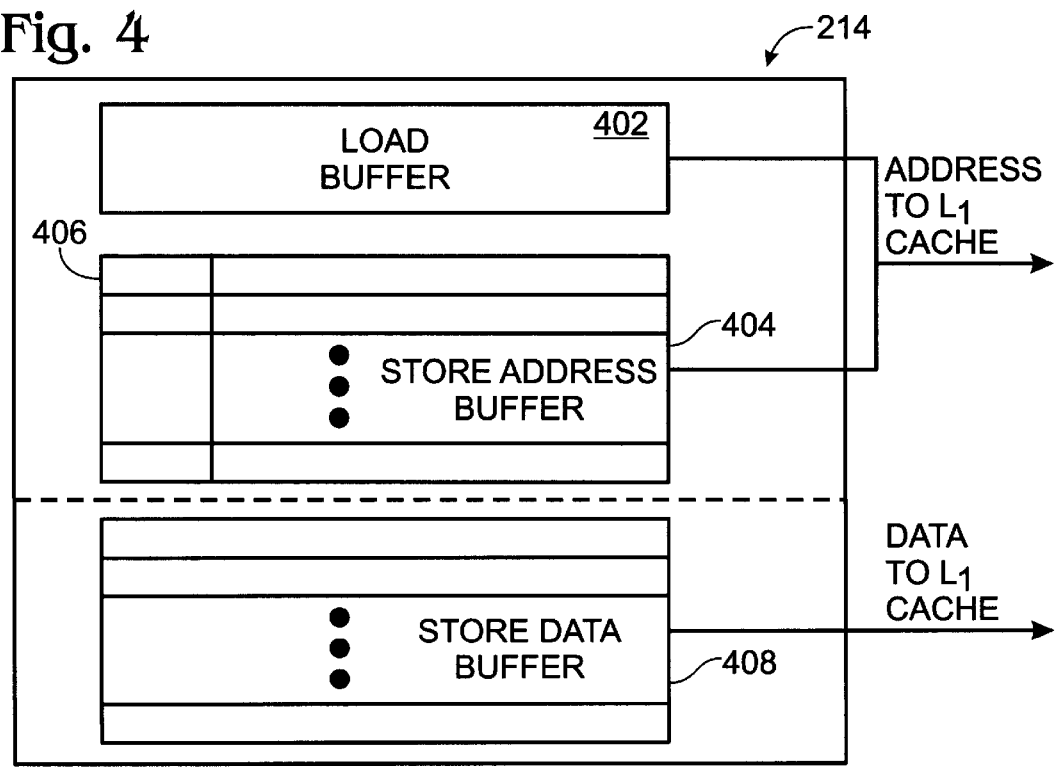
FIG. 4 illustrates a block diagram of an example store address, store data and load buffers of the memory ordering unit of the example processor depicted in FIG. 2, in accordance with one embodiment of the present invention.

As depicted in FIG. 4, memory ordering unit 214 comprises load buffer 402, store address buffer 404 and the store data buffer 408, coupled as shown. In accordance with one aspect of the present invention, each element of store address buffer 404 of memory ordering unit 214 includes a mask field 406 for storing the mask of a received byte masked write instruction. In one embodiment, mask field 406 is eight-bits long. As will be apparent, from the description to follow, the mask identified by the SRC2 operand of the byte masked write instruction is received unshifted from address generation unit 210 and stored in the new eight-bit mask field 406 of each store address buffer 404.

If, memory ordering unit 214 receives an indication from address generation unit 210 that the byte masked write can be accommodated within a single cache line of the L1 cache, e.g., 32 bytes broken into four 8-byte chunks [chunk 3:chunk 0], memory ordering unit 214 forwards the mask untouched to L1 cache controller 216. If, however, the masked write will span two cache lines of the L1 cache, memory ordering unit 214 dispatches two separate masked write micro-operations, one for each cache line, a condition to be developed in greater detail below.

Memory ordering unit 214 sends the mask unshifted for the lower half of the line split and it sends the shifted mask for the upper half. The lower three bits of the address are used to do the shifting for unaligned accesses. The lower five bytes of the address are zeroed out by memory ordering unit 214 on dispatches of upper half line splits, so that the L1 cache controller will not rotate the mask again (memory ordering unit already sends the shifted mask in dispatch of the upper half line split on a masked write). Thus, the adjusted length for the upper half of the line split (i.e., the length of the macro-instruction minus that of the lower split) is also sent by memory ordering unit 214 to L1 cache controller 216, for reasons to be described more fully below.

Once all of the memory ordering constraints are cleared in memory ordering unit 214, the byte masked write is issued to L1 cache controller 216. In general, L1 cache controller 216 is used as a memory interface with system memory 110 and L2 cache 103. As will be described in greater detail below, L1 cache controller 216 contains the L1 cache used to cache data and/or control signals, and a buffer used to service L1 cache misses and uncacheable requests. Once L1 cache controller 216 accepts the dispatch of the masked write from memory ordering unit 214, it determines if the mask associated with the byte masked write is comprised of all zeroes. Thus, in addition to the similar determination performed by address generation unit 210, L1 cache controller 216 may also perform such a test in case memory ordering unit 214 dispatch of a masked write is merely one-half of a split across two cache lines, which presents the opportunity for one of the two cache lines to have a mask of all zeroes. That is, the mask arriving at L1 cache controller 216 will only be all zeroes if it is one of the two dispatches of a line split masked write macro-instruction, i.e., if the masked write dispatch is not a line split and the mask is all zeroes, address generation unit 210 would have canceled the write as a NOP, and it would have never made it to memory cluster 212, as described above.

For a split line masked write whose mask corresponding to either half of the split is all zeroes, such half will not be executed. Rather, L1 cache controller 216 will discard that half of the operation as a NOP. In this instance, the NOP signifies that the instruction will not be cached or buffered in L1 cache controller 216, and therefore no request is sent to bus controller 218. That is, the byte masked write instruction is retired without further updating or tying up of hardware resources of memory subsystem 212. The lower half of the line split us treated as a non-line-split access. L1 cache controller 216 always shifts the mask using the lower three bits of the address, and subsequently, performs an OR operation of the mask to check for all zeroes. For the upper half, memory ordering unit 214 shifts the mask using the lower three bits of the address, L1 cache controller 216 does no shifting in this case since the lower three bits of the address for upper half line splits are all zeroes.

If the mask is all zeroes for the lower half dispatch of a line split masked write, L1 cache controller 216 still latches its address, so that data can be rotated and written into memory correctly upon dispatch of the upper half. This is needed because memory ordering unit 214 will have sent the data unshifted when issuing the upper half of the line split.

Figure 5:
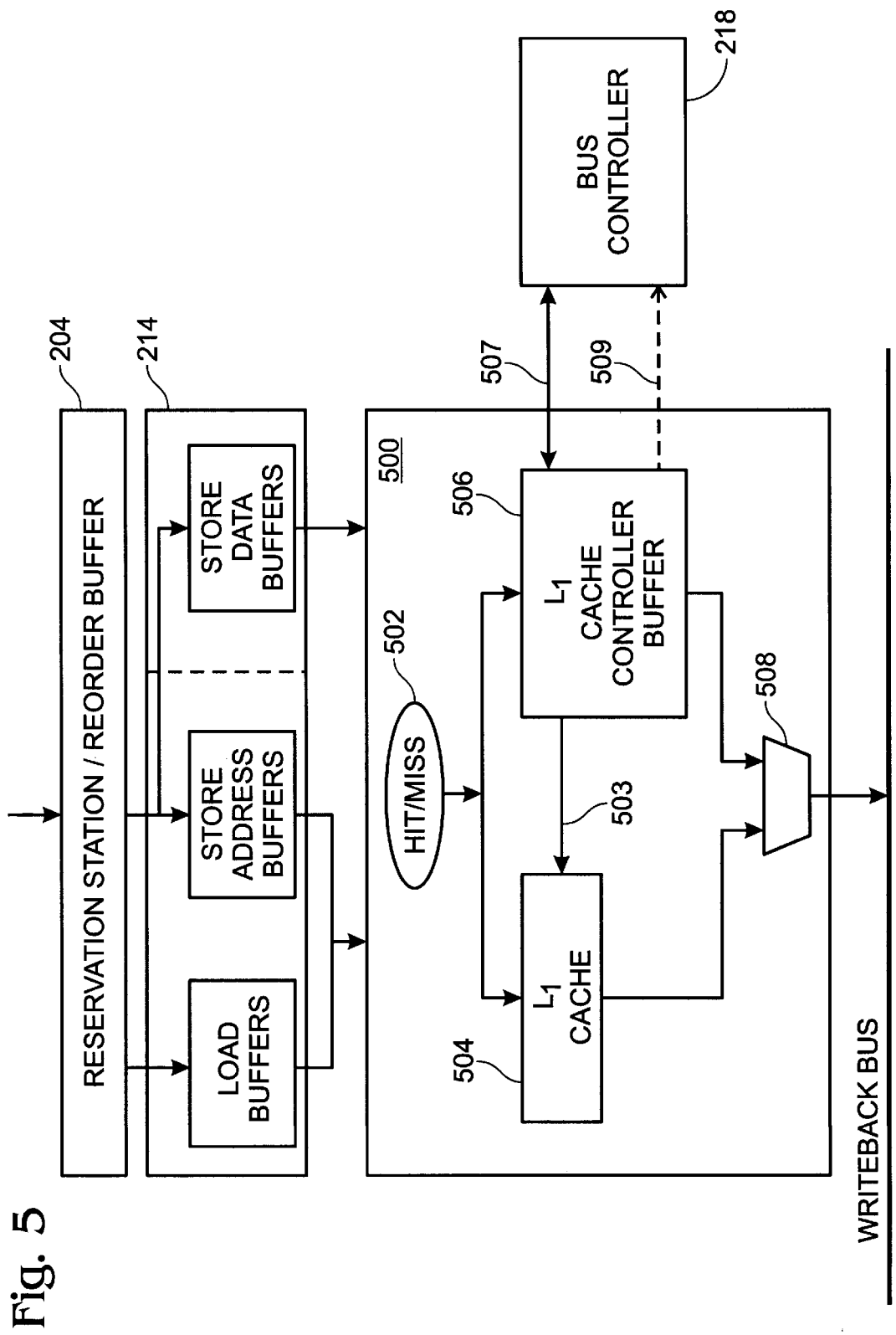
FIG. 5 illustrates a block diagram of an example L1 cache controller incorporating the teachings of the present invention and suitable for use within the example processor of FIG. 2, in accordance with one embodiment of the present invention.

As shown, FIG. 5 depicts a more detailed block diagram of an example L1 cache controller 500, in accordance with the teachings of the present invention. In one embodiment, L1 cache controller 500 may be beneficially integrated in processor 200 as L1 cache controller 216. In accordance with the teachings of the present invention, as depicted in FIG. 5, L1 cache controller 500 is comprised of a comparator 502 to identify L1 cache or buffer hits/misses, L1 cache 504 to store cacheable accesses, L1 cache controller buffer 506 for servicing uncacheable accesses or cache misses, and multiplexer 508 for selecting between the output of L1 cache 504 or L1 cache buffer 506 on load writebacks to the execution core. In accordance with one aspect of the present invention, L1 cache controller 216 will treat masked writes differently depending on the memory attribute of the instruction. In general, instructions may be one of two types, cacheable or uncacheable. However, there are a number of sub-memory types within each of these two general classes, each causing L1 cache controller 500 to function in a unique way. Thus, an overview of the memory types supported by processor 200 is warranted.

In one embodiment of the foregoing processor architecture, five different memory types are supported including writeback memory type (WB), a write through memory type (WT), a strongly ordered uncacheable memory type (UC), an uncacheable speculative write combining memory type (USWC), and the write protected memory type (WP). The WB, WP, WT and UC memory types are all well known to those skilled in the art, and need not be further described here. The USWC is a weakly ordered (e.g., processor execution does not necessarily follow program order), write-combining (e.g., writes are combined/merged with subsequent writes in a buffer until a line is fully written, or until an eviction condition (e.g., a fence operation) is received). In one embodiment, the USWC memory type is never memory aliased and always writes to or reads from external memory; therefore, USWC access never hit the caches. USWC masked writes are mergeable, i.e., they combine with other mergeable stores, but not readable, i.e., they do not forward data to subsequent instructions.

On an L1 cache hit by a cacheable masked write (e.g., WB MASKMOVQ), only those 64-bit chunks for which at least one bit of the shifted mask is high will be active. In one embodiment, unaligned eight-byte writes always write to two chunks. The byte enables denoted by the mask select which bytes to write. Note that WT is also cacheable, while will also update external memory, so even on a cache it, it allocates an L1 cache controller buffer.

For an uncacheable masked write (e.g., WP, USWC, or UC MASKMOVQ), or a L1 cache miss by a cacheable masked write (e.g., WB or WT memory type), L1 cache controller 500 allocates a buffer in L1 cache buffer 506 and a request is issued to bus controller 218. Bus controller 218 interfaces with both L2 cache 104 and system memory 110. In one embodiment, cacheable masked writes that missed L1 cache 504 or uncacheable masked writes always update system memory 110, e.g., they do not update either L1 cache 504 or L2 cache 104. Instead, the cache line targeted by a masked write is flushed from L1 cache 504 and/or L2 cache 104, if present, invalidating the line if in exclusive or shared state, or written back to memory and invalidate the cache line if in modified state. Cacheable masked writes that miss L1 cache 504 (e.g., WB or WT) do not need to flush the L1 cache, since it was a miss, and the line is therefore not in L1 cache 504. In one embodiment, the mask is sent from L1 cache controller 516 to bus controller 218 through byte enables. L1 cache controller 500 includes a buffer control field in L1 cache controller buffer 506 which, when set for a corresponding byte of data written from the execution core, becomes the byte enable for that byte in bus controller 218 upon initiating a bus request. In one embodiment, this 32-bit control field is referred to as byte_written control field (not shown) of L1 cache controller buffer 506, wherein the byte enables are transmitted to bus controller 218 via control line 509, as shown in FIG. 5. In one embodiment, the size of data bus 508 between L1 cache controller 500 and bus controller 218 and the data size of dispatch from the execution core is eight-bytes wide, the byte enables are an eight-bit field extracted from the byte_written control field starting at the byte signaled by the address of the request.

As alluded to above, the function of L1 cache controller 500 is based, at least in part, on the memory type of the instruction being processed. Cacheable masked writes (e.g., WB or WT) are non-temporal. They minimize any disturbance in the cache hierarchy. Upon cache hits, they behave like regular cacheable stores, whereas on cache misses, they employ a no-write allocate policy and are weakly ordered write combining. In one embodiment, cache hits do not update the LRU bits, thereby minimizing cache pollution.

In one embodiment, for WB or WT masked writes that miss the L1 cache, or USWC masked writes, an L1 cache controller buffer 506 is allocated in write combining mode. Subsequent writes of the same type merge or combine in buffer 506 until it is fully written or there is an eviction condition (e.g., an incoming UC operation, fence operation, etc.). For partial, i.e., not fully written, write combining evictions cache controller 500 sends the shifted mask through byte enables to bus controller 218 via control line 509. In one embodiment, L1 cache controller 500 also sends the address. If the instruction crosses two cache lines, L1 cache controller 500 issues two separate requests, each request having its own eight-bit byte enable corresponding to the byte_written control field in their respective L1 cache controller buffer(s) 506. In accordance with one aspect of the present invention, for fully-written write combining, no byte-enables need be sent since bus controller 218 picks up all 32-bytes of the line eight-bytes at a time, in accordance with the data size of internal bus 508.

In one embodiment, strictly ordered UC and WP masked writes behave like any other strictly ordered uncacheable store. Upon sending a bus request, the appropriate cache line of L1 cache 504 and/or L2 cache 104 is flushed. That is, if memory aliasing occurred and the cache line targeted by the masked write is in L1 cache 504 and/or L2 cache 104, the line is invalidated if in exclusive or shared state, or written back to memory and invalidate the line if in modified state.

For the write protected (WP) or strongly ordered uncacheable (UC) masked writes, or WT masked writes hitting L1 cache 504, L1 cache controller 500 sends the unshifted mask through the byte enables, in addition to sending the address and the length of the request to bus controller 218 via control line 509 and data bus 507. In accordance with one embodiment of the present invention, data bus is 64-bits in length. As will be described more fully below, bus controller 218 uses the lower three bits of the address to shift and align the byte enables, while the length is used to determine the endbyte of the mask. In one embodiment, for writes to a lower half of a cache line split, or for writes that can be accommodated within a single line, the data is sent unshifted from L1 cache controller 500 via data bus 507. In one embodiment, for writes to an upper half of a cache line split, data is shifted by L1 cache controller 500 and the shifted mask, the adjusted length and the address are sent as received from memory ordering unit 214.

Returning to the illustrated example embodiment of processor 200 depicted in FIG. 2, bus controller 218 is shown comprising backside bus controller 224 and extended bus controller 220. Backside bus controller 224 is operative to control accesses from L1 cache controller 216 to L2 cache 103 via backside bus 223, as depicted. Extended bus controller 220 is operative to coordinate accesses from L1 cache controller 216 to system memory 110 via external host bus 106. One example of an extended bus controller according to the teachings of the present invention is presented in FIG. 6.

Figure 6:
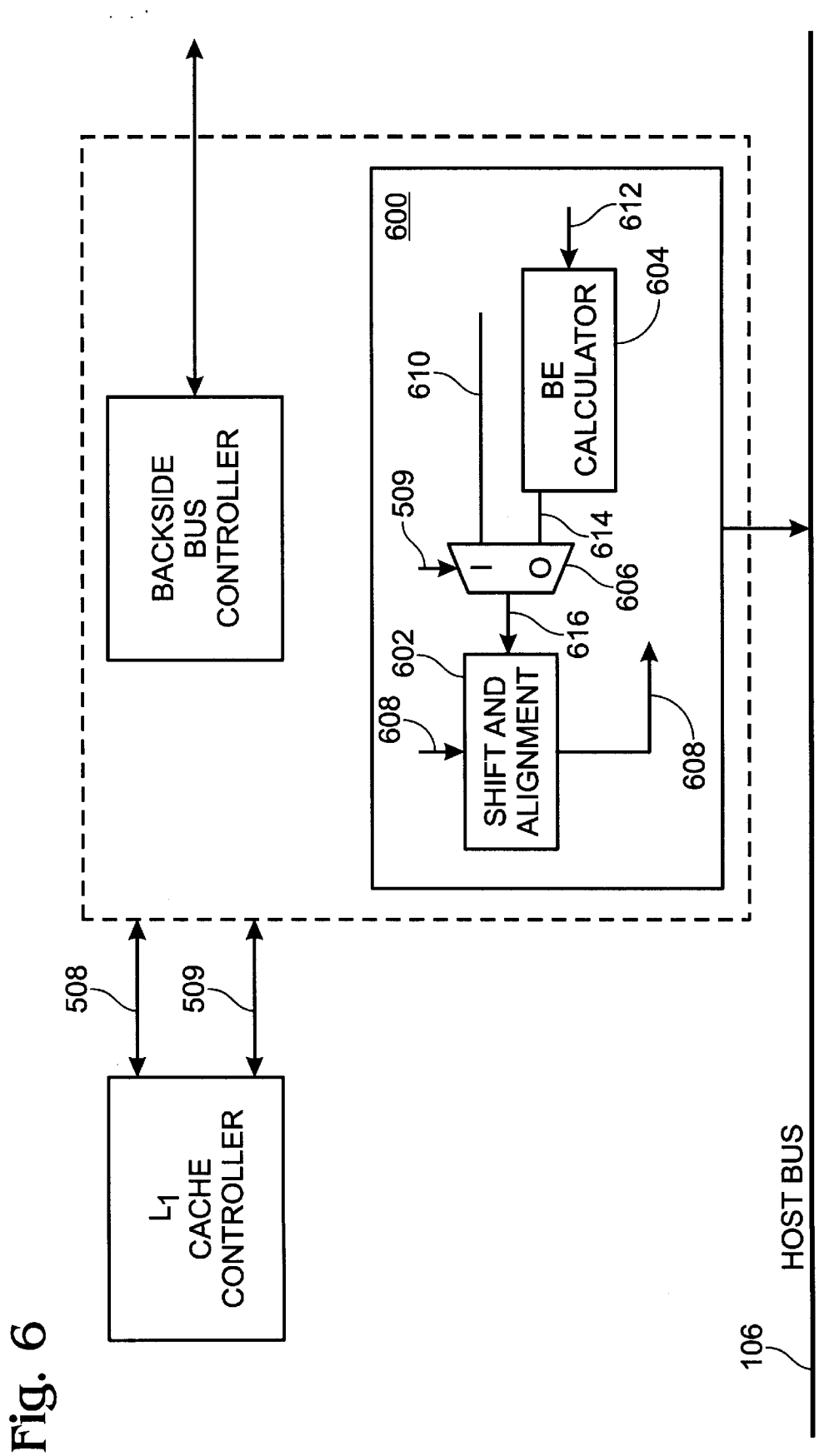
FIG. 6 illustrates a block diagram of an example write combine circuit incorporating the teachings of the present invention and suitable for use within the example processor of FIG. 2, in accordance with one embodiment of the present invention

Turning to FIG. 6, a block diagram depicting the interface between bus controller 218 and the external host bus 106 is depicted. In one embodiment, for example, the interface is comprised of external bus controller 600. In accordance with this example embodiment, FIG. 6 illustrates a block diagram of example external bus controller 600, operative to pass the byte enables determined by the execution core, e.g., elements 202–216, of byte masked write instructions, and to calculate eight-bit unaligned, unshifted and contiguous byte enables for all other non-write combining instructions based, at least in part, on the length of the transaction. As depicted in the illustrated example embodiment of FIG. 6, external bus controller 600 includes byte enable (BE) calculator 604, multiplexer 606 and shift and alignment circuitry 602, cooperatively coupled as shown.

In accordance with one aspect of the present invention, external bus controller 600 includes byte enable (BE) calculator 604, operative to calculate byte enables for non-write combining instructions. In one embodiment, for example, BE calculator 604 calculates the byte enables for non-byte masked write instructions based on the length of the transaction received via line 612 from bus controller 218. In accordance with the teachings of the present invention, multiplexer 606 is operative to select either the byte enables 614 calculated by BE calculator 604 or, the byte enables 610 determined by the execution core for byte masked write instructions and provide the selected byte enables to shift and alignment circuitry 602 via line 616. Shift and alignment circuitry 602 is operative to shift and align the byte enables 614 received from multiplexer 606 based on the byte select address received from bus controller 218. More specifically, the selected byte enables, e.g., eight-bits provided by the execution core or calculated by BE calculator 604, are then shifted and aligned based on the lower three-bits of the address of the transaction received via line 608 to generate the sixteen-bit byte enables employed by system memory 110. In one embodiment of the present invention, shift and alignment circuitry 602 outputs a sixteen-bit byte enable via line 618 to external bus 106, as shown. The upper or lower eight-bits will be all zeroes for a chunk-aligned access.

SIMD Instruction Set/Byte Masked Write

Given the foregoing architectural description of processor 200 incorporated with the teachings of the present invention, an enhanced SIMD instruction set will now be introduced, with reference to FIGS. 7 through 10. Before delving into the instruction set, for ease of explanation, the packed data types introduced earlier will be described with reference to FIG. 7.

Figure 7:
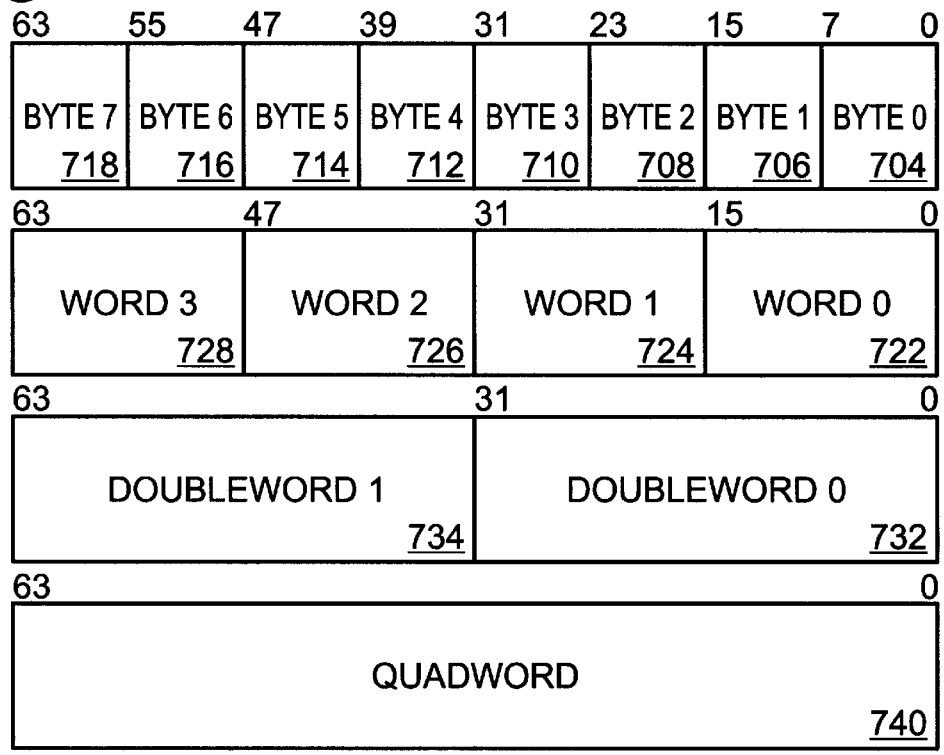
FIG. 7 illustrates packed data-types suitable for use in SIMD processor architectures, according to one embodiment of the present invention.

With reference to FIG. 7, a number of alternate packed data types are depicted, according to one example embodiment of the present invention. In particular, four packed data formats are illustrated in FIG. 7; packed byte 702, packed word 720, packed doubleword 730 and packed quadword 740. Packed byte 702, in one embodiment of the invention, is sixty-four bits long [63:0] containing eight one-byte elements 704–718, respectively. Generally, a data element is an individual piece of data that is stored in a single register (or memory location) with other data elements of the same length. In one embodiment of the present invention, the number of data elements stored in a register is 64-bits long divided by the length of the bits of a data element. Accordingly, in one embodiment, packed word 720 is 64-bits long and comprises four 16-bit words 722–728, respectively. Packed doubleword is 64-bits long and contains two 32-bit doublewords 732 and 734, respectively. Packed quadword is 64-bits long and contains one 64-bit quadword 740.

Byte Masked Write Instructions

In accordance with one aspect of the present invention, a new instruction is introduced to SIMD instruction set 209 which enable select, non-contiguous bytes of packed data to be moved in a single instruction. In particular, SIMD instruction set 209 includes the byte masked quadword move (MASKMOVQ SRC1, SRC2) instruction As described above, the byte masked quadword move (MASKMOVQ) may be of any memory type. A cacheable byte masked write hitting the cache (e.g., L1, L2, L3, etc. cache) minimizes pollution of the cache by not updating the LRU bits. A cacheable byte masked write missing the cache is non-temporal and adheres to a weakly-ordered write-combining paradigm; therefore, the instruction bypasses all processor caches. In accordance with one embodiment of the present invention, the format of the byte masked quadword move (MASKMOVQ) instructions is as follows:

MASKMOVQ SRC1, SRC2        (1)

In accordance with one aspect of the present invention, the byte masked quadword move instruction (MASKMOVQ) is operative to configure processor 200 to move select bytes of packed data from a first SIMD register 312, 316, 318, etc. ("MM1") denoted by the first operand SRC1 to a memory location implicitly specified by a register, using the byte mask located in a second SIMD register 312, 316, 318, etc. ("MM2") denoted by the second operand SRC2. More specifically, in accordance with one embodiment of the present invention, individual bytes of data are stored from the MM1 register to the location specified by (E)DI register 320, by analyzing the most significant bit in each byte of the mask register MM2 on a per-byte basis. As discussed above, a mask of all zeroes will issue as a NOP, thereby saving a pipeline stage. In one embodiment, the byte masked quadword move operation is operative to move select bytes of a 64-bit packed data register to an implicitly defined location. Conceptually, the byte masked quadword move operation may be viewed as follows:

```
if(MM2[7])      M64[edi]     = MM1[7:0]
if(MM2[15])     M64[edi + 1] = MM1[15:8]
if(MM2[23])     M64[edi + 2] = MM1[23:16]
if(MM2[31])     M64[edi + 3] = MM1[31:24]
if(MM2[39])     M64[edi + 4] = MM1[39:32]
if(MM2[47])     M64[edi + 5] = MM1[47:40]
if(MM2[55])     M64[edi + 6] = MM1[55:48]
if(MM2[63])     M64[edi + 7] = MM1[63:56]
```

Accordingly, where the most significant bit of each byte of the mask identified by SRC2, e.g., MM2, is active (logic 1), the corresponding byte in the MM1 register identified by the SRC1 operand will be written to a memory location identified a register (e.g., one of general registers 310). Moreover, in accordance with the nature of the byte masked quadword move operation, discussed above, any bytes corresponding to a write enable mask will minimize pollution of any resident caches (L1, L2, L3, etc.) of processor 200 incorporating the teachings of the present invention. Thus, in accordance with the teachings of the present invention, the byte masked write operations described herein enable processor 200 incorporating the teachings of the present invention to move select, non-contiguous bytes of data to an implicitly defined memory location, in a single instruction, thereby overcoming the inherent limitations and deficiencies commonly associated with the prior art.

Having introduced the enhanced SIMD instruction set 209 in general, and the byte masked write instructions of the present invention in particular, an example implementation will now be described with reference to the flow chart depicted in FIG. 8.

Figure 8:
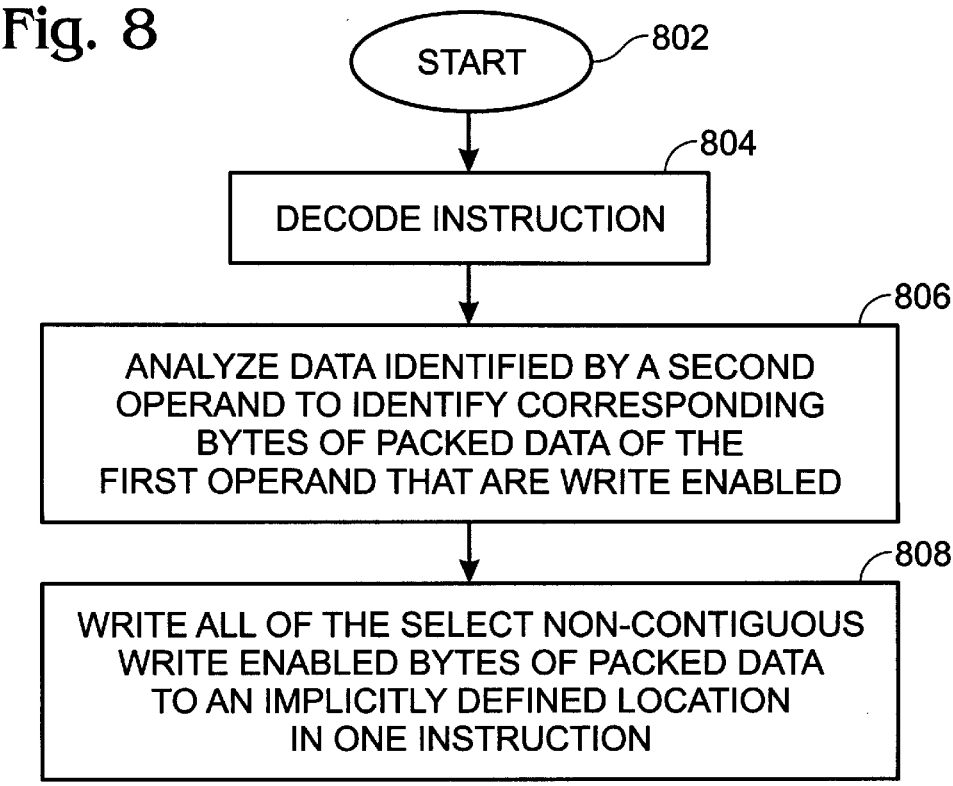
FIG. 8 is a flow chart illustrating an example method incorporating the teachings of the present invention for moving select, non-contiguous bytes of packed data, in accordance with one embodiment of the present invention.

Turning to FIG. 8, a flow chart illustrating an example method incorporating the teachings of the present invention for writing select, non-contiguous bytes of packed data to an implicitly defined location in a single instruction, is presented. As depicted in the illustrated example embodiment of FIG. 8, example method 800 begins when a processor, incorporated with the teachings of the present invention, e.g., processor 200, receives a byte masked write instruction, step 802. In accordance with one embodiment of the present invention, processor 200 receives the instruction from system memory 110 at decoder 202 and decodes the instruction having a first operand SRC1 identifying a first register (MM1) and a second operand SRC2 identifying a second register (MM2), step 804. In accordance with the teachings of the present invention, the MM1 register contains eight bytes of integer data, while the MM2 register contains eight one-byte masks corresponding to the eight bytes in the MM1 register. Once the instruction is decoded, decoder 202 issues the decoded byte masked move instruction to reservation station 204, wherein the instruction is issued along dispatch bus 207 to execution unit(s) 208, address generation unit 210 and the memory cluster 212 once all of the data necessary to execute the decoded instruction is available.

In accordance with one embodiment of the present invention, processor 200 analyzes the eight byte masks in the MM2 register to identify corresponding bytes in the MM1 register to write to a location defined by (E)DI register 320, step 806. More specifically, as discussed in detail above, address generation unit 210, memory ordering unit 214 and L1 cache controller 216 each analyze the data in the byte mask in the MM2 register identified by SRC2 to determine whether corresponding individual bytes of the packed data in the MM1 register identified by the SRC1 register are write-enabled, e.g., binary one. In one embodiment, processor 200 analyzes only the most significant bit of each byte mask to determine whether it is write-enabled. In an alternate embodiment, processor 200 ANDs all of the bits in the byte mask to determine whether the byte mask is write-enabled. Additionally, each of address generation unit 210, memory ordering unit 214 and L1 cache controller 218 determine whether the byte masked write will cause a cache line split and, if so, the byte mask is adjusted accordingly, as described above. One example each of a non-cache line split byte masked write and a split cache line byte masked write are provided with reference to FIGS. 9 and 10.

Figure 10:
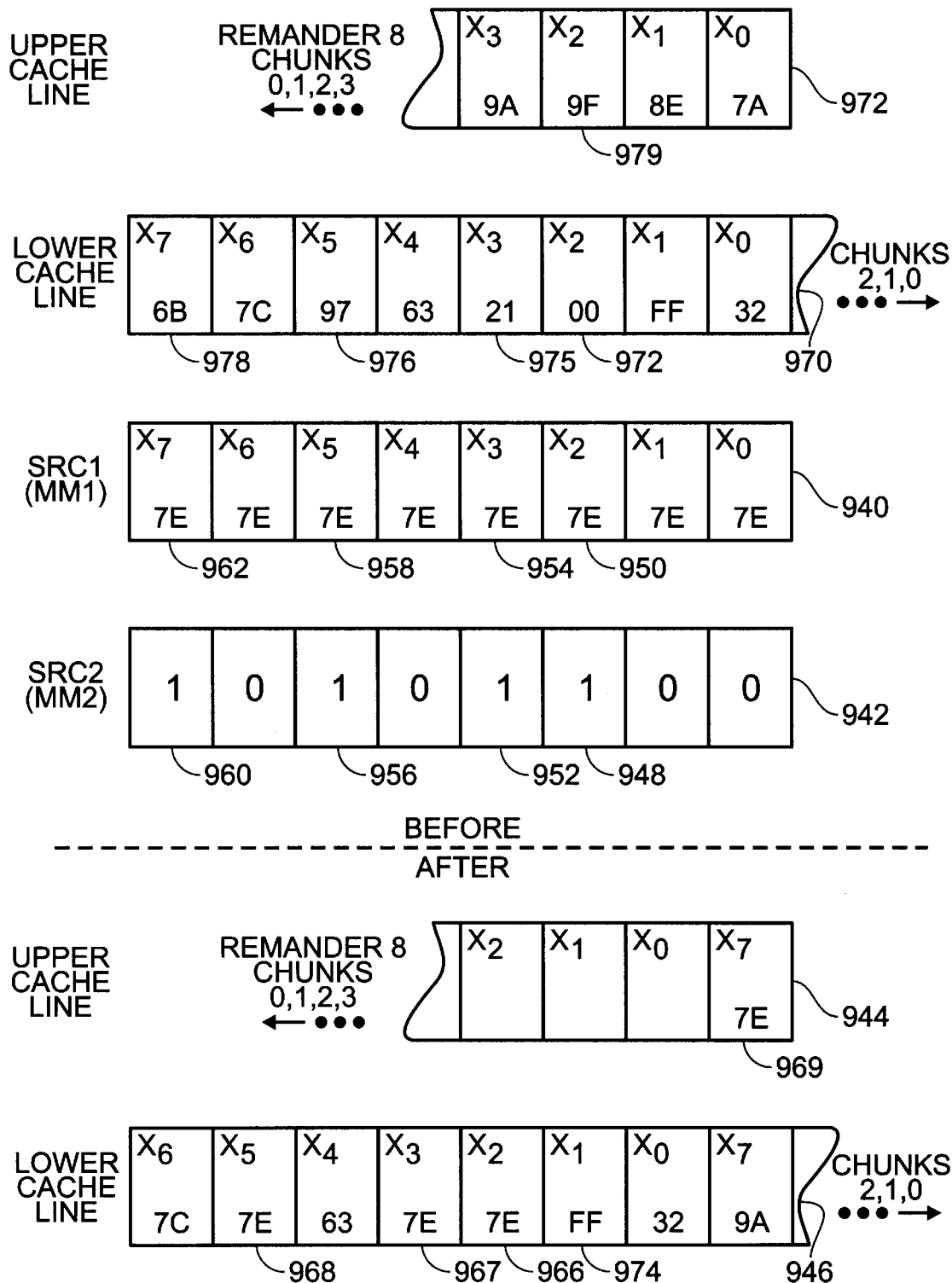
FIG. 10 illustrates the result of a byte masked write requiring a cache line split across two L1 cache lines, in accordance with the teachings of the present invention.
Figure 9:
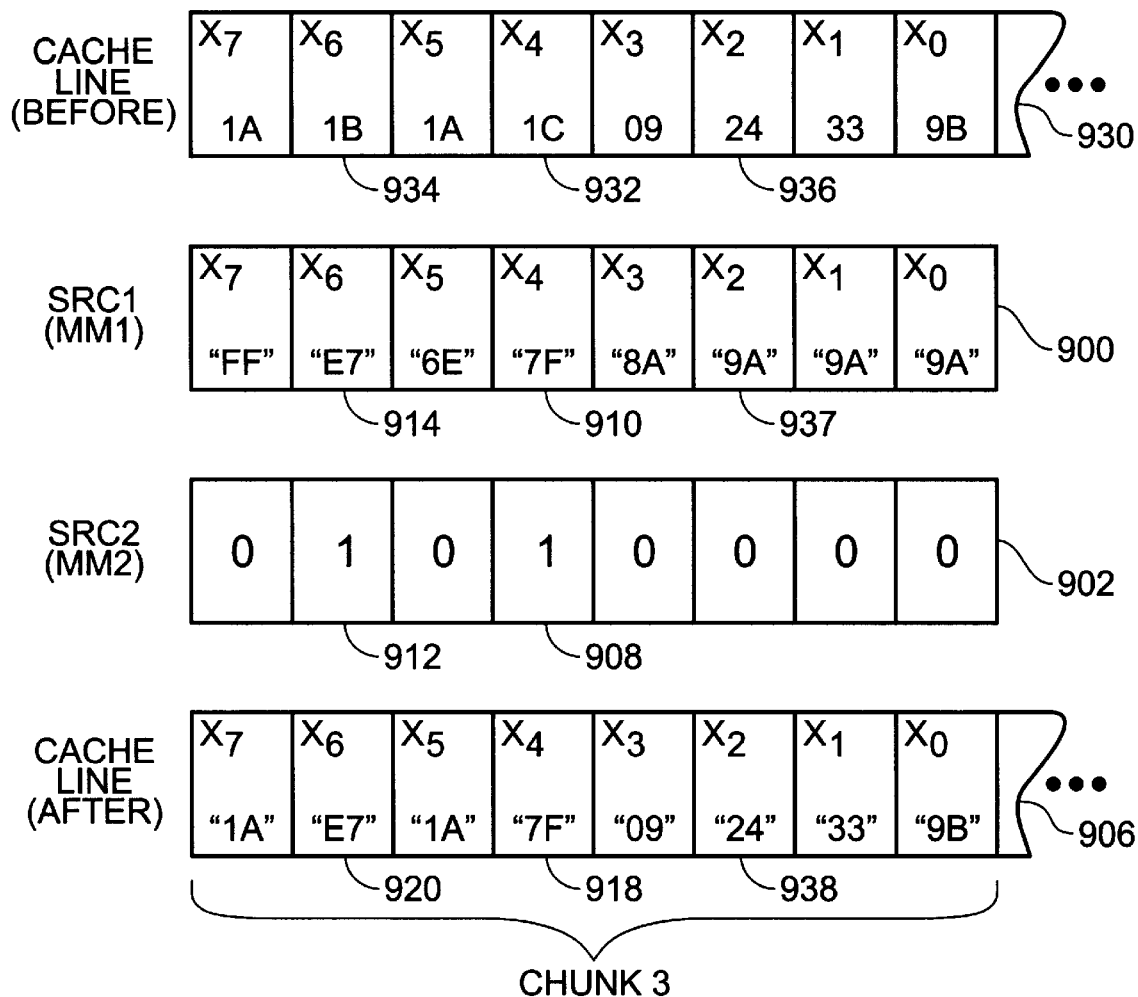
FIG. 9 illustrates the result of a byte masked write to a single L1 cache line, in accordance with the teachings of the present invention.

Turning briefly to FIGS. 9 and 10, one example each of a byte masked write accommodated within a single cache line, and one causing a cache line split is depicted. With reference to FIG. 9, examples of the MM1 register identified by SRC1 900 is depicted, alone with the MM2 register identified by SRC2 902 and the upper eight-byte chunk (chunk 3) of a cache line before the byte masked write 930 and after the byte masked write 906 are depicted. Upon issuance of the byte masked write instruction denoting SRC1 and SRC2, bytes 910 and 914 of MM1 900 are write-enabled by bytes 908 and 912 of the mask stored in MM2 902, respectively. Thus, byte 910 and 914 (X4 and X6) of MM1 900 will be written to cache line 906 at bytes 918 and 920, respectively. Note that the pre-existing data in byte 936 has not been affected in byte 938.

With reference to FIG. 10, an example of a byte masked write causing a cache line split is illustrated. As above, FIG. 10 presents MM1 940, MM2 942, the least significant chunk (chunk 0) of an upper cache line and the most significant chunk (chunk 3) of a lower cache line both before 972, 970 and after 944, 946 execution of the innovative byte masked write instruction. As depicted in FIG. 10, bytes 948, 952, 956 and 960 in MM2 register 942 write enable corresponding bytes 950, 954, 958 and 962 in MM1 register 940. In this case, however, memory ordering unit 214 determines that the byte masked write will require a cache line split. Consequently, in accordance with the teachings of the present invention, memory ordering unit 214 will dispatch two separate masked write micro-operations, e.g. one for each cache line 944 and 946. The first dispatch corresponds to the lower half of the line split, e.g., cache line 946. Memory ordering unit 214 sends the mask unshifted for the lower half of the line split, and sends a shifted mask for the upper half of the line split. Thus, in accordance with one embodiment of the present invention, the first three write-enabled bytes 950 and 954 and 958 of MM1 register 940 will be written to the lower half of the cache line split at locations 966, 967 and 968, respectively, in the first byte masked write micro-operation. In an alternate embodiment, the three most significant write-enabled bytes 962, 958 and 954 of MM1 register 940 could be selected for the lower half the cache line split.

As described above, in order to properly align the write to upper cache line 944, memory ordering unit 214 must shift the mask for the upper half dispatch. The lower three bits of the address are used to do the shift for the unaligned access. The lower five bytes of the address are zeroed out by memory ordering unit 214 on dispatches of upper half line splits, so that L1 cache controller 216 will not rotate the mask again. That is, memory ordering unit 214 already sent the shifted mask on dispatch of the upper half line split of the masked write. The adjusted length for the upper half of the line split, i.e., the length of the macro-instruction minus that of the lower split, is also sent by the memory ordering unit 214. Accordingly, for the lower half of the line split access, L1 cache controller 216 shifts the mask using the lower three bits of the address, and subsequently performs an OR operation. For the upper half, memory ordering unit 214 shifts the mask using the lower three bits of the address, and L1 cache controller 216 ORs the bits of the shifted mask. Subsequently, L1 cache controller 216 is operative to place the remaining byte 962 of MM1 register 940 in the least significant byte 969 of the least significant chunk of upper cache line 944, with an appropriately shifted mask.

Having analyzed each byte of the eight byte mask located in the MM2 register, step 806, processor 200 moves the write enabled bytes of the packed data to a location implicitly specified by a register, step 808. In one embodiment, the location is specified in the (E)DI register 320 of general registers 310. In one embodiment, for cache hits by cacheable accesses, processor 200 updates L1 cache 504, and for cache misses or uncacheable accesses, processor moves the write enabled bytes stored in L1 cache controller buffer 506 to a location defined by (E)DI register 320. More specifically, as described in detail above, in response to control information provided by L1 cache controller 216, and bus controller 218, write combine buffer 600 is operative to write select, non-contiguous bytes of packed data to an implicitly defined memory location for byte masked write operations, or calculates write enables for other write instructions. Thus, in accordance with aspect of the present invention, processor 200 incorporating the teachings of the present invention is operative to write select, non-contiguous bytes of packed data based, at least in part, on the write-enables obtained from the byte mask of the MM2 register.

Storage Medium

Although certain aspects of the present invention have been described in significant detail above in association with hardware and instruction set embodiments, those skilled in the art will appreciate that those aspects of the present invention described in terms of hardware may well be embodied in software without deviating from the spirit and scope of the present invention. Accordingly, FIG. 11 illustrates an example storage medium having stored therein machine executable instructions including the byte masked write instructions of the present invention.

Figure 11:
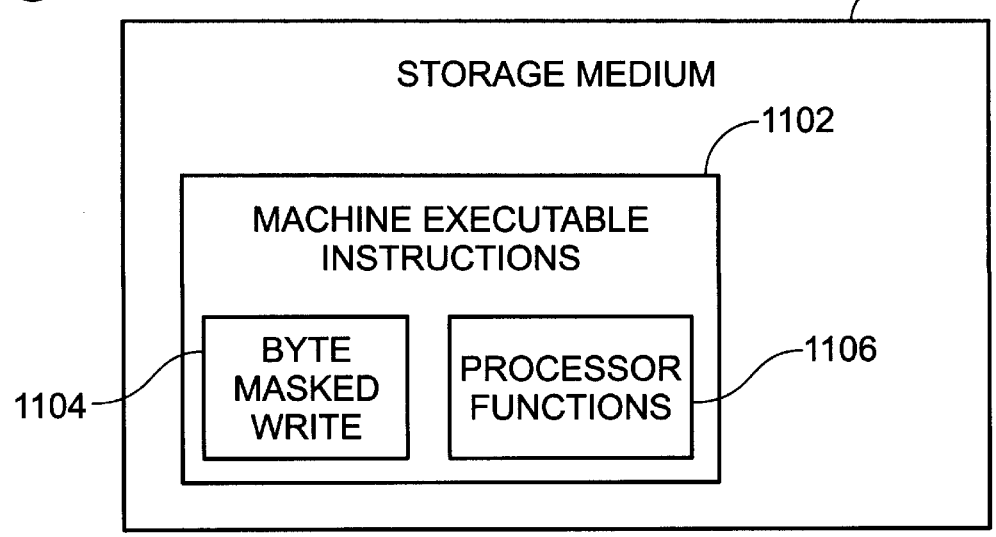
FIG. 11 is a block diagram illustration of a computer readable storage medium incorporating the teachings of the present invention, in accordance with one embodiment of the present invention.

As depicted in FIG. 11, storage medium 1100 is presented. Those skilled in the art will appreciate that storage medium 1100 represents any of a number of alternative storage mediums such as, for example, a magnetic floppy disk, an optical disk, magnetic tape media, a hard disk, a "zip" disk, an erasable programmable read-only memory (EPROM), read-only memory (ROM), a flash memory device, or any other type of storage media. As depicted, storage medium 1100 has stored thereon a plurality of machine executable instructions 1102. In accordance with one embodiment of the present invention, machine executable instructions 1102 include the byte masked write instructions 1104 of the present invention. In accordance with another embodiment of the present invention, machine executable instructions include processor functions 1106 described above for executing the byte masked write instructions 1104 for writing select, non-contiguous bytes of packed data to an implicitly defined location, in a single instruction. Thus, those skilled in the art will appreciate that the teachings of the present invention may well take any of a number of alternate hardware and software forms, or combination thereof, without deviating from the spirit and scope of the present invention.

Thus, in accordance with the foregoing description of certain aspects of the present invention, those skilled in the art will appreciate that the innovative processor architecture and instruction set described herein advantageously configures a processor to move select, non-contiguous bytes of data using only two operands, relying on implicitly defined target address(es) located in a register. Moreover, the present invention improves performance by reducing time spent on cache management. That is, the data processed in accordance with the teachings of the present invention is intended to minimize cache pollution by not updating the LRU bits on a cache hit. It is not necessary to first write-allocate the cache-line corresponding to the store address, and then have to manage subsequent requests from other processors for the data contained in that cache-line.

While the method and apparatus of the present invention has been described in terms of the above illustrated embodiments, those skilled in the art will recognize that the invention is not limited to the embodiments so described. The present invention can be practiced with modification and alteration within the spirit and scope of the appended claims. Accordingly, the description is to be regarded as illustrative instead of restrictive on the present invention.

Thus, a method and apparatus for moving select, non-contiguous bytes of packed data in a single instruction has been described.

We claim:

1. A method comprising:

decoding a single instruction within a processor, wherein the decoded instruction includes a first operand identifying a plurality of bytes of packed data and a second operand identifying a corresponding plurality of byte masks;

analyzing individual byte masks identified by the second operand corresponding to individual bytes of the packed data identified by the first operand of the decoded single instruction to determine which of the plurality of bytes of packed data are write-enabled bytes; and moving the write-enabled bytes to an implicitly defined location based, at least in part, on the analyzing.

2. The method of claim 1, wherein the write-enabled bytes are non-contiguous bytes of packed data.

3. The method of claim 1, wherein the analyzing comprises analyzing an individual bit of each of the byte masks to determine whether the corresponding byte of packed data identified by the first operand is one of the write-enabled bytes.

4. The method of claim 1, wherein the analyzing comprises analyzing bits of each of the byte masks to determine whether the corresponding byte of packed data identified by the first operand is one of the write-enabled bytes.

5. The method of claim 1, wherein the analyzing comprises:

determining whether the entire byte identified by the second operand is comprised of logic 0's; and identifying which bits of the byte identified by the second operand are comprised of a logic 1, where it is determined that the entire byte is not comprised of logic 0's.

6. A method comprising:

decoding a single instruction within a processor, wherein the decoded instruction includes a first operand identifying a plurality of bytes of packed data and a second operand identifying a corresponding plurality of byte masks;

analyzing individual byte masks identified by the second operand corresponding to individual bytes of the packed data identified by the first operand of the decoded single instruction; and moving select bytes of the packed data identified by the first operand to an implicitly defined location based, at least in part, on the analysis of the individual byte masks identified by the second operand, wherein moving the select bytes of the packed data bypasses processor caches.

7. An apparatus comprising:

a processor; and an instruction set including byte masked write instructions, accessible by the processor which, when executed by the processor configures the processor to:

decode a single instruction from the instruction set, wherein the decoded instruction includes a first operand identifying a plurality of bytes of packed data and a second operand identifying a corresponding plurality of byte masks;

analyze individual byte masks identified by the second operand corresponding to individual bytes of the packed data identified by the first operand of the decoded single instruction to determine which bytes of the plurality of bytes of packed data are write-enabled bytes; and move the write-enabled bytes to an implicitly defined location based, at least in part, on the analysis.

8. The apparatus of 7, wherein the processor further comprises a plurality of caches for temporarily storing instructions and data.

9. The apparatus of 8, wherein the write-enabled bytes moved to the implicitly defined location bypass the plurality of caches.

10. The apparatus of 7, wherein the write-enabled bytes are non-contiguous bytes of packed data.

11. The apparatus of 7, wherein the processor is to analyze select bits of each of the byte masks to determine whether corresponding bytes of the packed data are the write-enabled bytes.

12. The apparatus of 11, wherein individual bytes of the packed data are write-enabled bytes when the select bits of the corresponding byte mask are binary one (1).

13. A computer readable medium having stored thereon a plurality of instructions including an instruction having a first operand identifying a plurality of bytes of packed data and a second operand identifying a corresponding plurality of byte masks, which when executed by a processor, the instruction configures the processor to analyze each individual byte mask to determine whether corresponding bytes of the packed data are write-enabled bytes, and to move the write-enabled bytes to an implicitly defined location based, at least in part, on the analysis of the individual byte masks.

14. The computer readable medium of claim 13, wherein the instruction configures the processor to analyze select bits of each individual byte mask to determine whether the corresponding bytes are the write-enabled bytes.

15. The computer readable medium of claim 13, wherein the processor is operative to move the write-enabled bytes to an implicitly defined location based, at least in part, on the analysis of the byte masks, upon execution of the single instruction.

16. The computer readable medium of claim 13, wherein the processor is operative to move the write-enabled bytes to an implicitly defined location, upon execution of the single instruction.

* * * * *